(12) United States Patent
Jurik et al.

(10) Patent No.: US 9,885,461 B2
(45) Date of Patent: Feb. 6, 2018

(54) HOMOGENIZATION SYSTEM FOR AN LED LUMINAIRE

(71) Applicant: Robe Lighting s.r.o., Roznov pod Radhostem (CZ)

(72) Inventors: Pavel Jurik, Prostredni Becva (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 14/682,853

(22) Filed: Apr. 9, 2015

(65) Prior Publication Data

US 2016/0298827 A1    Oct. 13, 2016

(51) Int. Cl.
| | |
|---|---|
| *F21V 9/08* | (2006.01) |
| *F21V 21/30* | (2006.01) |
| *G02B 27/14* | (2006.01) |
| *F21Y 113/00* | (2016.01) |

(52) U.S. Cl.
CPC ............... *F21V 9/08* (2013.01); *F21V 21/30* (2013.01); *G02B 27/141* (2013.01); *F21Y 2113/005* (2013.01)

(58) Field of Classification Search
CPC .......... F21V 9/08; F21V 21/30; G02B 27/141
See application file for complete search history.

(56) References Cited

U.S. PATENT DOCUMENTS 4,386,848 A * 6/1983 Clendenin ............... F41G 3/165
244/3.13
2014/0204586 A1    7/2014 Roberge et al.

FOREIGN PATENT DOCUMENTS

| CN | 102518964 A | 6/2012 |
|---|---|---|
| EP | 2 461 087 A1 | 6/2012 |
| WO | WO2006129220 | 12/2006 |
| WO | WO2011112914 | 9/2011 |
| WO | WO2012176117 | 12/2012 |

* cited by examiner

*Primary Examiner* — Mary Ellen Bowman
(74) *Attorney, Agent, or Firm* — Conley Rose, P.C.; Grant Rodolph; Brooks W. Taylor

(57) ABSTRACT

A remotely directable luminaire with an improved color LED homogenization system for LED luminaires employing a plurality of LED arrays where an array employs a plurality of discrete peak LED groups and dichroic mirrors maximized for transmission/reflection of around the groups of LED's discrete peaks to generate a directional homogenized color light beam with additive color mixing.

1 Claim, 12 Drawing Sheets

HOMOGENIZATION SYSTEM FOR AN LED LUMINAIRE

RELATED APPLICATION

This application claims the priority of U.S. Provisional Application Ser. No. 61/752,006 filed on 14 Jan. 2013 and utility application Ser. No. 14/155,178 filed on 14 Jan. 2014.

TECHNICAL FIELD OF THE INVENTION

The present invention generally relates to a method for controlling the light output from an array of LEDs when used in a light beam producing luminaire, specifically to a method relating to combining multiple colors of LED into a single homogenized light beam.

BACKGROUND OF THE INVENTION

High power LEDs are commonly used in luminaires for example in the architectural lighting industry in stores, offices and businesses as well as in the entertainment industry in theatres, television studios, concerts, theme parks, night clubs and other venues. These LEDs are also being utilized in automated lighting luminaires with automated and remotely controllable functionality. For color control it is common to use an array of LEDs of different colors. For example a common configuration is to use a mix of Red, Green and Blue LEDs. This configuration allows the user to create the color they desire by mixing appropriate levels of the three colors. For example illuminating the Red and Green LEDs while leaving the Blue extinguished will result in an output that appears Yellow. Similarly Red and Blue will result in Magenta, and Blue and Green will result in Cyan. By judicious control of these three controls the user may achieve nearly any color they desire. More than three colors may also be used and it is well known to add Amber, Cyan, or Royal Blue LEDs to the Red, Green and Blue to enhance the color mixing and improve the gamut of colors available.

The differently colored LEDs may be arranged in an array in the luminaire where there is physical separation between each LED, and this separation, coupled with differences in die size and placement for each color, may affect the spread of the individual colors and results in objectionable spill light and color fringing of the combined mixed color output beam. It is common to use a lens or other optical device in front of each LED to control the beam shape and angle of the output beam; however these optical devices commonly have differing effect for different colors and color fringing or other aberrations may be visible in the output beam. It is also known to use dichroic reflecting filters to combine three single colors of LED into a beam. However, these systems do not provide means for mixing more than three colors of LEDs. It would be advantageous to have a system which provides good homogenization of more than three colors of LEDs into a single output light beam.

There is a need for a homogenization system for an LED array based luminaire which provides improvements in homogenization for LED systems comprising four or more different colors of LEDs.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Embodiments of the an improved LED light homogenizer are illustrated in the FIGUREs, like numerals being used to refer to like and corresponding parts of the various drawings.

The present invention generally relates to a method for controlling the light output from an array of LEDs when used in a light beam producing luminaire, specifically to a method relating to providing improvements in homogenization for LED systems comprising different colors of LEDs.

Figure 1:
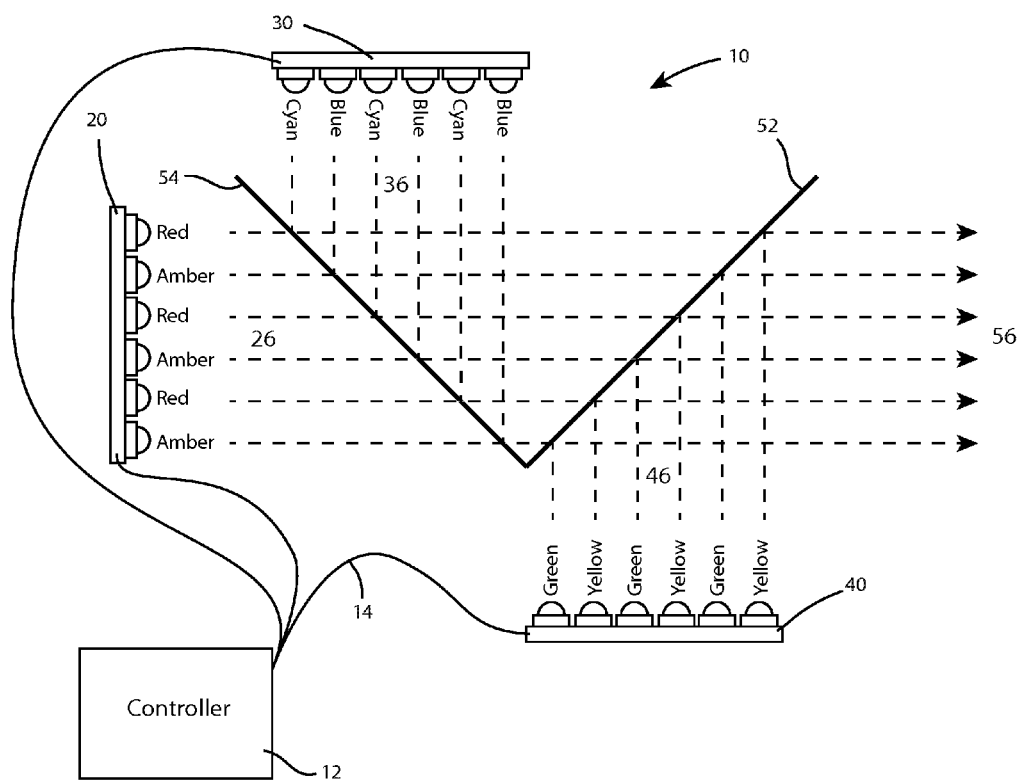
FIG. 1 illustrates an embodiment of an improved LED light homogenizer.

FIG. 1 illustrates a schematic of an embodiment of an improved LED light homogenizer 10. A first LED array 20 may comprise an arrangement of LED's with discrete longer wavelength peaks such as red and amber LEDs. A second LED array 30 may comprise an arrangement of LED's with discrete short wavelength peaks such as blue and cyan LEDs. A third LED array 40 may comprise an arrangement of LED's with discrete midrange wavelength peaks such as yellow and green LEDs. Each array, 20, 30 and 40, may have the associated LEDs arranged in a layout such that the colors are well distributed and mixed across the array. In the embodiment shown the LED arrays 20, 30, and 40 are controlled by a controller 12, electrically connected 14 to the LED arrays 20, 30, and 40.

In some embodiments there are a limited number of discrete peak LED's in an array. For example in the embodiment illustrated there are two discrete peak types for the three arrays employed: the long wavelength array 20 has red and amber, the short wavelength array 30 has blue and cyan and the third midrange array 40 has green and yellow. In some embodiments all of the LEDs from an array are controlled by the controller 12 as a unit. In other embodiments the lights of distinct colors are controlled independent of the other distinct colors. So for example in the long bandwidth array, the red LEDs are controlled as a separate color than the amber LEDs.

The red and amber light 26 from first LED array 20 impinges on the rear of dichroic filter 54. Dichroic filter 54 is designed such that it will allow light in red and amber wavelengths to pass through unaffected. In the embodiment illustrated filter 54 may be designed as a long pass filter generally letting through wavelengths longer than a certain cut off. In alternative embodiments this filter may be designed to be a band pass filter that lets discrete long wavelength light through where the band passes match the peak wavelengths of the discrete LEDs in the long wavelength array 20. Lights of other wavelengths are not allowed to pass and are reflected out of the light beam.

The red and amber light from transmitted through filter 54 from first LED array 20 next impinges on the rear of dichroic filter 52. Dichroic filter 52 is also designed such that it will allow light in red and amber wavelengths to pass through unaffected. The characteristics of alternative embodiments of filter 52 are further discussed below. But with respect to the red and amber light, filter 52 acts either a long pass or a band pass for the longer red and amber wavelengths. Thus the red and amber light 26 from first LED array 20 will exit in light beam 56.

The blue and cyan light 36 from second LED array 30 impinges on the front of dichroic filter 54. As previously described, dichroic filter 54 is designed as a long pass filter (or discrete long band bands pass) and therefore it will reflect light in shorter blue and cyan wavelengths.

The blue and cyan light from second LED array 30 next impinges on the rear of dichroic filter 52. As previously described Dichroic filter 52 allows passage of long wavelengths. Dichroic filter 52 is also allow designed to allow passage of short wavelengths such that it will allow light in blue and cyan wavelengths to pass through unaffected. Thus the blue and cyan light 36 from second LED array 30 will also exit in light beam 56, superimposed on any red and amber light from first LED array 20.

The green and yellow light 46 from third LED array 40 impinges on the front of dichroic filter 52. Dichroic filter 52 is designed such that it will reflect light in the midrange of the color spectrum thus reflecting rather than transmitting green and yellow wavelengths. Thus the green and yellow light 46 from third LED array 40 will also exit in light beam 56, superimposed on any red and amber light from first LED array 20 and any blue and cyan light from second LED array 30.

Thus, by selective transmission and reflection by dichroic filters 52 and 54, all colors of LED: red, amber, blue, cyan, green and yellow, are homogenized and superimposed into a single exit beam 56.

The example shown here utilizes six colors of LED; red, amber, blue, cyan, green, and yellow, however the invention is not so limited and other mixes of LED colors are possible without departing from the spirit of the invention. For example, a royal blue LED could be utilized instead of, or as well as, the cyan LED on LED array 30. For each choice of LEDs on the arrays a corresponding design change must be considered for the dichroic filters so that they reflect and/or transmit the appropriate light wavelengths.

Figure 2:
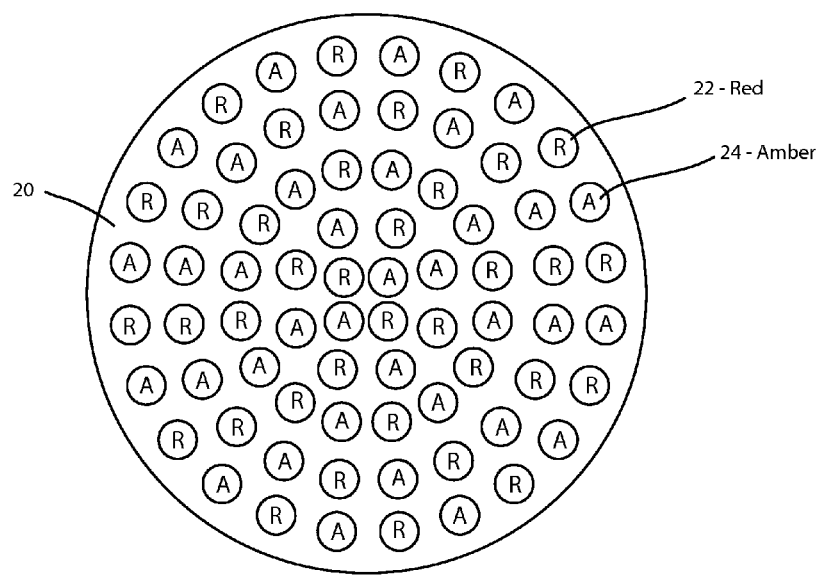
FIG. 2 illustrates an embodiment of a first LED array of the LED light homogenizer illustrated in FIG. 1.

FIG. 2 illustrates an embodiment of a first LED array 20 of the invention. In this embodiment a plurality of red LEDs 22 and a plurality of amber LEDs 24 are distributed across array 20. The arrangement and numbers of each of the red and amber LEDs may be chosen such as to optimize the mix and balance of the two colors. For example, if the amber LEDs are twice as powerful as the red LEDs, it may only be necessary to have half the number of amber as red. In that instance, the array would comprise two-thirds red LEDs 22 and one-third amber LEDs 24. The array 20 illustrated is circular, however the invention is not so limited and array 20 may be any shape chosen from but not limited to circular, square, rectangular, hexagonal, or octagonal.

Figure 3:
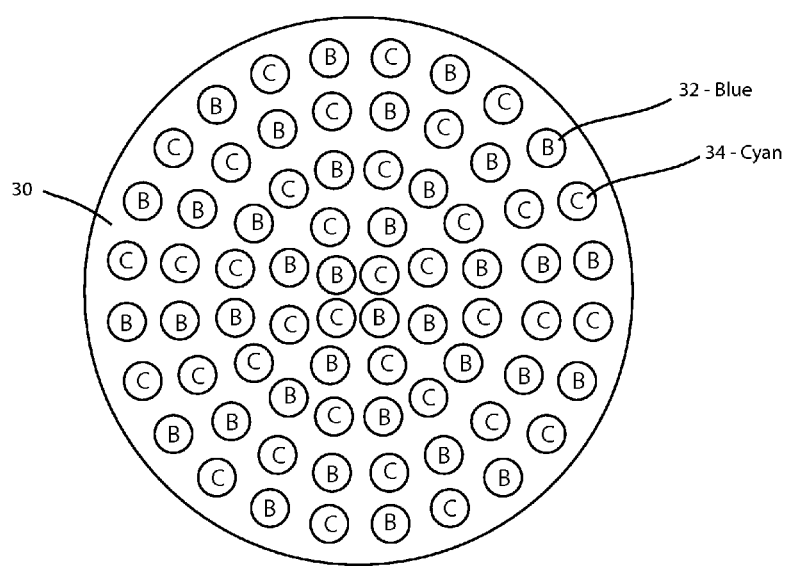
FIG. 3 illustrates an embodiment of a second LED array of the LED light homogenizer illustrated in FIG. 1.

FIG. 3 illustrates an embodiment of a second LED array 30 of the invention. In this embodiment a plurality of blue LEDs 32 and a plurality of cyan LEDs 34 are distributed across array 30. The arrangement and numbers of each of the blue and cyan LEDs may be chosen such as to optimize the mix and balance of the two colors. The array 30 illustrated is circular, however the invention is not so limited and array 30 may be any shape chosen from but not limited to circular, square, rectangular, hexagonal, or octagonal.

Figure 4:
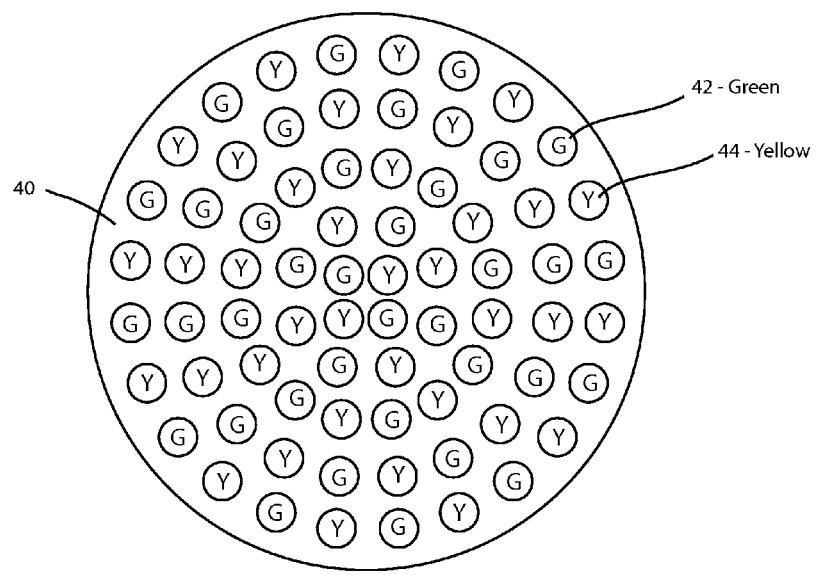
FIG. 4 illustrates an embodiment of a third LED array of the LED light homogenizer illustrated in FIG. 1.

FIG. 4 illustrates an embodiment of a third LED array 40 of the invention. In this embodiment a plurality of green LEDs 42 and a plurality of yellow LEDs 44 are distributed across array 40. The arrangement and numbers of each of the green and yellow LEDs may be chosen such as to optimize the mix and balance of the two colors. The array 40 illustrated is circular, however the invention is not so limited and array 40 may be any shape chosen from but not limited to circular, square, rectangular, hexagonal, or octagonal.

Figure 5:
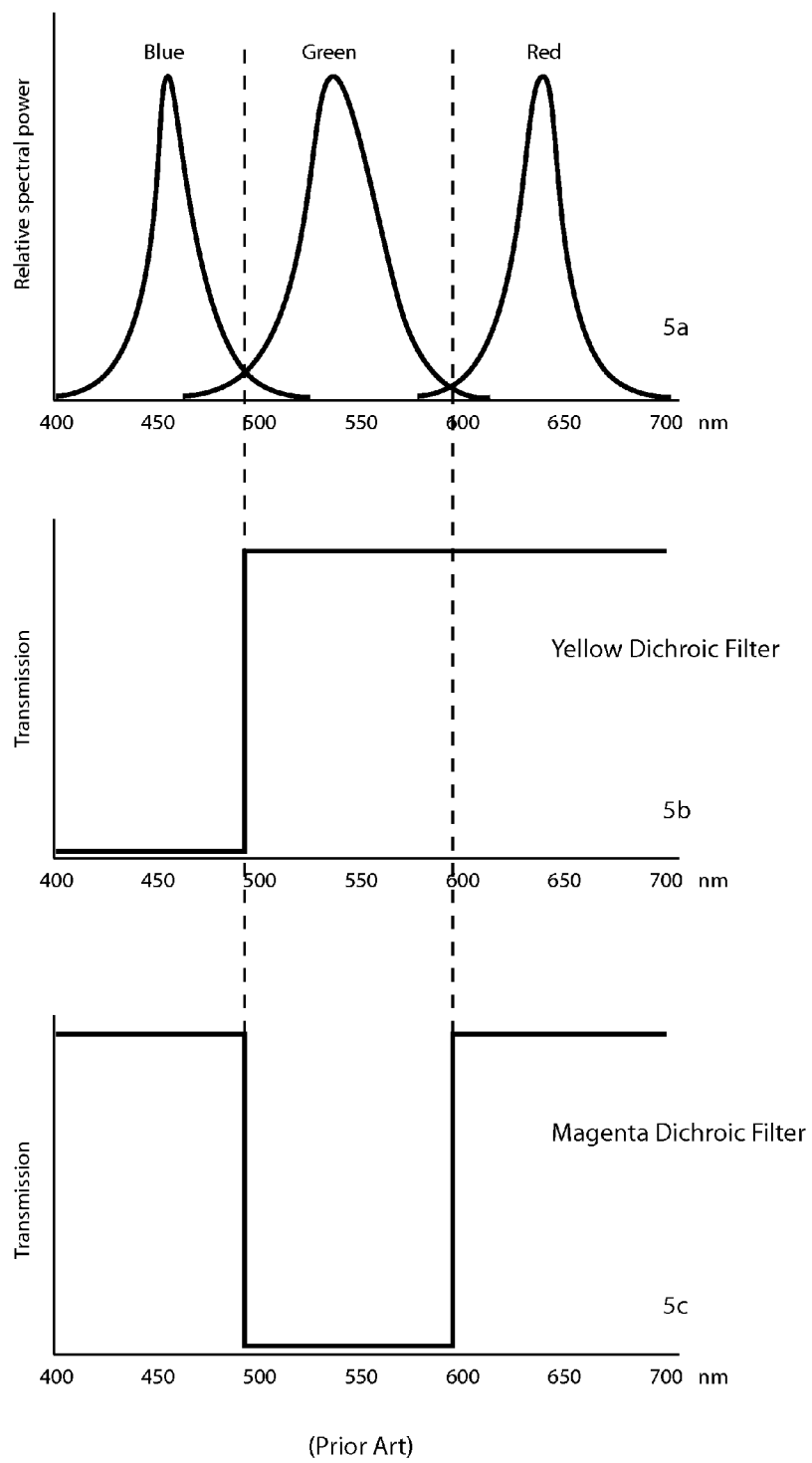
FIG. 5 illustrates the prior art use of transmissive/reflective dichroic filters.

FIG. 5 illustrates the prior art use of reflective dichroic filters in both homogenizers and beam splitters. Such arrangements of dichroic filters are commonly used to both combine light and to split light for video cameras into their red, green, and blue components. FIG. 5a shows the relative spectral power distributions (SPD) of the light emitted by red, green and blue LEDs with discrete wavelength peaks. It can be seen that the blue LED peaks at around 450 nm, the green at 550 nm and the red at 650 nm. The Yellow dichroic illustrated in 5b has a filter characteristic such that it allows the red, 650 nm, and green, 550 nm, light to pass unimpeded, while reflecting the blue, 450 nm. Such a filter would appear yellow to the eye. Similarly, the Magenta dichroic illustrated in 5c has a filter characteristic such that it allows the red, 650 nm, and blue, 450 nm, light to pass unimpeded, while reflecting the green, 550 nm. Such a filter would appear magenta to the eye. These two filters may be used in a layout similar to that shown in FIG. 1 as dichroic filters 52 and 54 so as to combine the output of red, green and blue LEDs. However, these filters would not allow us to add in amber, cyan, and yellow LEDs.

FIG. 6a shows the relative spectral power distributions (SPD) of the light emitted by an embodiment of the invention utilizing red, amber, green, yellow, blue, and cyan LEDs. It can be seen that the LED's have discrete wavelength peaks with blue LED peak at around 450 nm, the cyan at 475 nm, the green at 550 nm, the yellow at 575 nm, the amber at 625 nm, and the red at 650 nm. The Yellow/Amber dichroic illustrated in 6b has a filter characteristic such that it allows the red 650 nm, amber, 625 nm, yellow 575 nm, and green 550 nm, light to pass unimpeded, while reflecting the blue 450 nm and cyan 475 nm. Such a filter would appear yellow/amber to the eye. Similarly, the Pink dichroic 6c illustrated has a filter characteristic such that it allows the red, 650 nm, amber 625 nm, cyan 475 nm, and blue 450 nm, light to pass unimpeded, while reflecting the yellow 575 nm, and green, 550 nm. Such a filter would appear pink to the eye. These two filters may be used in FIG. 1 as dichroic filters 52 and 54 so as to combine the output of red, amber, green, yellow, blue, and cyan LEDs.

FIG. 7a illustrates an alternative embodiment extended to include further colors of LEDs. In this embodiment a Royal Blue LED of wavelength 440 nm has been added to second LED array 30. The appropriate filter characteristics of the dichroic filters to utilize this color are shown in FIGS. 7b and 7c.

Figure 8:
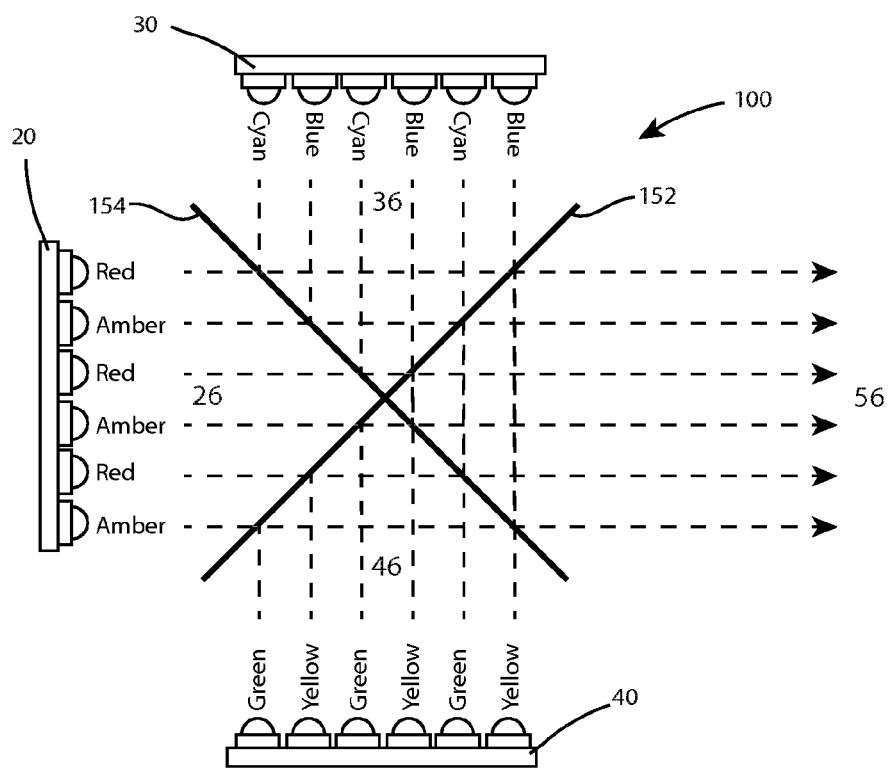
FIG. 8 illustrates an alternatively embodiment of the invention.

FIG. 8 illustrates a further embodiment of and LED light homogenizer 100. In the embodiment shown dichroic filters 152 and 154 have been arranged in a crossed arrangement as opposed to the serial arrangement shown in FIG. 1. This layout reduces the overall length of the assembly.

Figure 9:
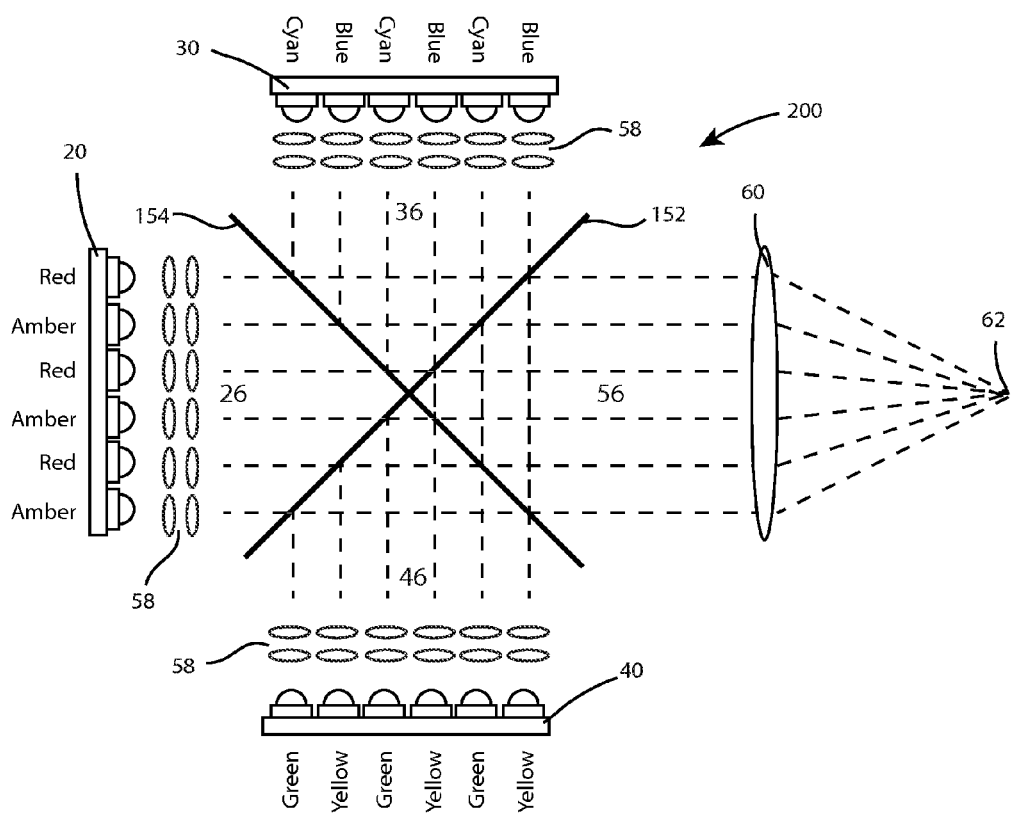
FIG. 9 illustrates a further embodiment of a LED light homogenizer.

The embodiments illustrated in FIG. 1, FIG. 8, and FIG. 9 show the red and amber emitters 20 at the rear with blue and cyan 30 on one side and yellow and green 40 on the other, however it should be understood that this layout is a single example of possible arrangements of the light emitters of the invention and that further embodiments with the LED emitters arranged differently. For example in alternative embodiments, the green and yellow LEDs 40 may be located at the rear where the red and amber LEDs 20 are illustrated in the Figures. Of course the configuration of the dichroic filters/mirrors 52, 54 and/or 152, 154 will have to match the configuration of the LEDs so that the desired colors pass 56 in the case of the rear LED array and reflect in the direction 56 in the case of the side LED arrays.

FIG. 9 illustrates a further embodiment of an LED light homogenizer and adds controlling optics to the system. Each LED may have a secondary optical system 58 which serves to collimate and direct the light beam through the dichroic filters 152 and 154. The system may also have focusing and homogenizing optics 60 which may focus the exiting light beam 56 to a focal point 62. Focusing and homogenizing optics 60 may include optical elements selected from but not restricted to; optical diffuser, holographic diffuser, non-Gaussian diffuser, integrating rod of any cross section, integrating tunnel of any cross section, or other optical means of homogenizing or mixing light as well known in the art. Focusing and homogenizing optics 60 may further include optical elements selected from but not restricted to a single positive or negative lens, or multiple lenses arranged in one or more optical groups. Such an optical system may have movable elements such that the focal length of the optics 60 is adjustable. The optical system may also include field stops, apertures, gates, gobos, and other optical devices well known in the art.

Figure 6:
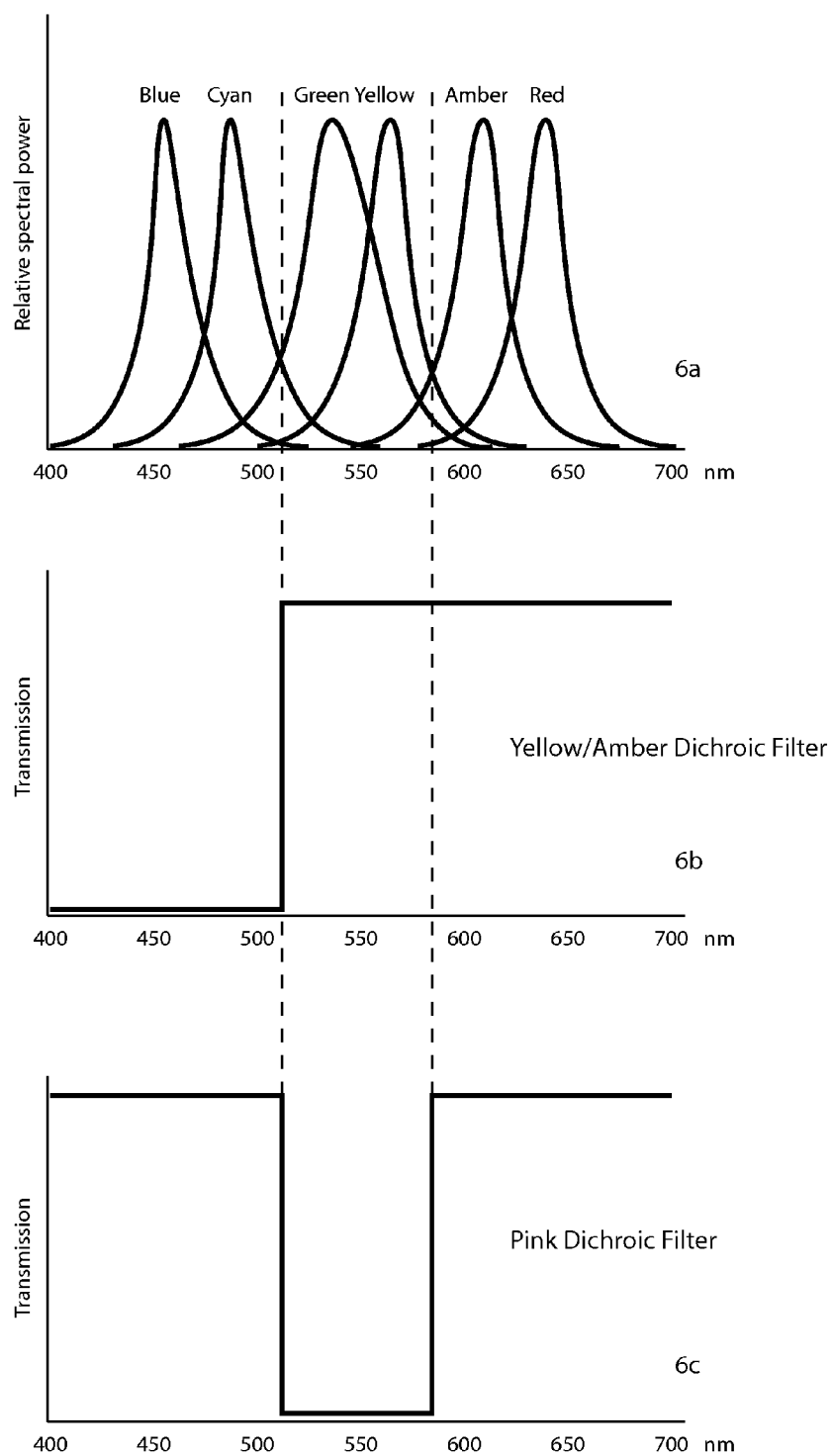
FIG. 6 illustrates the improved use of transmissive/reflective dichroic filters in the embodiment of the LED light homogenizer illustrated in FIG. 1, and/or FIG. 8.

The control of the filter characteristics of dichroic filters 52 and 54 is critical for the invention. The filters must be carefully manufactured such that their pass bands match the wavelengths of the LEDs utilized. The wavelength responses of the filters shown in FIG. 6 are shown very simplistically. In practice the response is not nearly sow square or abrupt. Additionally the response is shown generically so that it would work for both the embodiments illustrated in FIG. 1 as well as the embodiments illustrated in FIG. 8 and FIG. 9. The generalized response shows a cut-off length at around 500 nm for the Yellow dichroic filter which corresponds with filter 54 in FIG. 1 and 154 in FIG. 8 and FIG. 9. However, in other embodiments the cut-off length could be designed to be closer to 600 nm for filter 54 in FIG. 1.

By way of the example embodiments of FIG. 1, filter 54 should be designed to both: (1) maximize the Reflection of light at the LED peaks at around 450 nm (blue) and around 475 nm (cyan); and (2) maximize the transmission of light at LED peaks at around 625 nm (amber), and around 650 nm (red). Filter 52 should be designed to both: (1) maximize the reflection of light at the LED peaks at around 550 nm the (green), and around 575 nm (yellow); and (2) maximize the transmission of light at LED peaks around 450 nm (blue) and at 475 nm (cyan), around 625 nm (amber), and around 650 nm (red).

By way of the example embodiments of FIG. 8, filter 154 should be designed to both: (1) maximize the Reflection of light at the LED peaks at around 450 nm (blue) and around 475 nm (cyan); and (2) maximize the transmission of light at LED peaks at around 550 nm the (green), around 575 nm (yellow), around 625 nm (amber), and around 650 nm (red). Filter 152 should be designed to both: (1) maximize the reflection of light at the LED peaks at around 550 nm the (green), and around 575 nm (yellow); and (2) maximize the transmission of light at LED peaks around 450 nm (blue) and at 475 nm (cyan), around 625 nm (amber), and around 650 nm (red).

Figure 7:
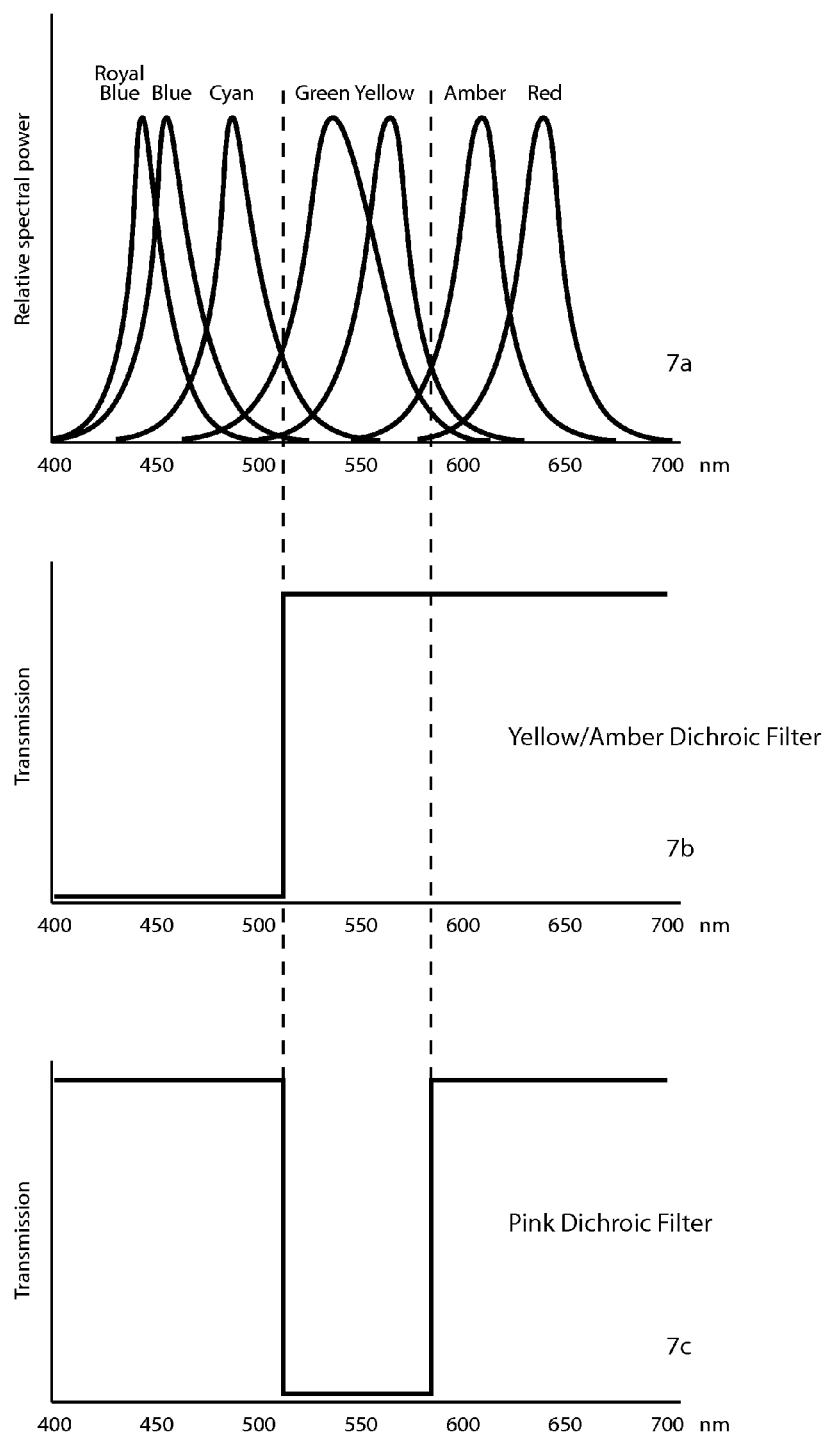
FIG. 7 illustrates an alternative embodiment of the improved light homogenizer.

By way of the example embodiments of FIG. 1 with the LED peaks of FIG. 7, filter 54 should be designed to both: (1) maximize the Reflection of light at the LED peaks at around 440 nm (royal blue), around 450 nm (blue) and around 475 nm (cyan); and (2) maximize the transmission of light at LED peaks at around 625 nm (amber), and around 650 nm (red). Filter 52 should be designed to both: (1) maximize the reflection of light at the LED peaks at around 550 nm the (green), and around 575 nm (yellow); and (2) maximize the transmission of light at LED peaks around 440 nm (royal blue), around 450 nm (blue) and at 475 nm (cyan), around 625 nm (amber), and around 650 nm (red).

By way of the example embodiments of FIG. 8 with the LED peaks of FIG. 7, filter 154 should be designed to both: (1) maximize the Reflection of light at the LED peaks at around 440 nm (royal blue), around 450 nm (blue), and around 475 nm (cyan); and (2) maximize the transmission of light at LED peaks at around 550 nm the (green), around 575 nm (yellow), around 625 nm (amber), and around 650 nm (red). Filter 152 should be designed to both: (1) maximize the reflection of light at the LED peaks at around 550 nm the (green), and around 575 nm (yellow); and (2) maximize the transmission of light at LED peaks around 440 nm (royal blue), around 450 nm (blue), around 475 nm (cyan), around 625 nm (amber), and around 650 nm (red).

It should be appreciated that in their preferred modes of each of the embodiments described herein, the LED array 20, 30 and 40 are controlled by a controller 10 which is connected to the arrays. The connection may be electrical as illustrated in FIG. 1 or may be by wireless communication means for controlling the LED's capacity to output light. In a preferred embodiment, the control of the colors as defined by their peak wavelength are controlled independent of the other colors similarly defined and at least one of multiple arrays has multiple such defined colors each independently controllable.

Figure 10:
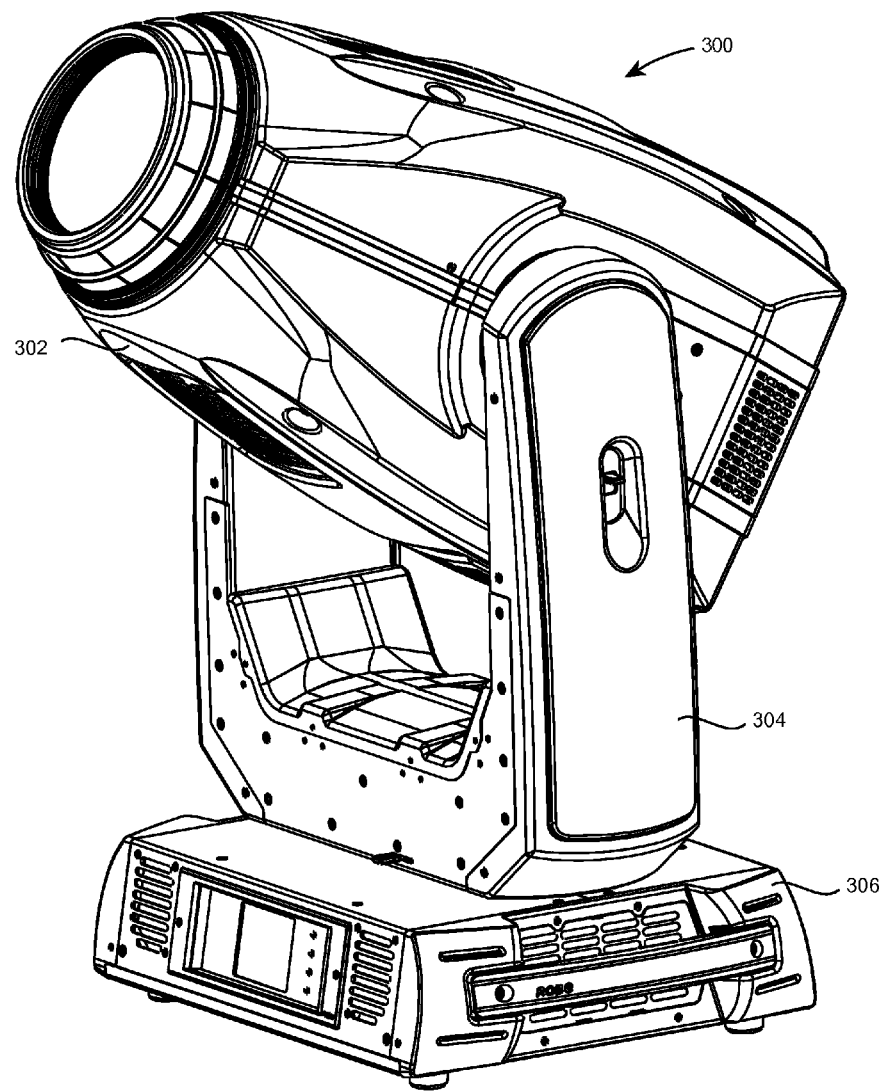
FIG. 10 illustrates an alternative embodiment of automated luminaire improved LED light homogenizer.

FIG. 10 illustrates an automated luminaire containing an embodiment of the improved LED light homoginizer. Luminaires with automated and remotely controllable functionality are well known in the entertainment and architectural lighting markets. Such products are commonly used in theatres, television studios, concerts, theme parks, nightclubs and other venues. A typical product will provide control over the pan and tilt functions of the luminaire allowing the operator to remotely control the direction the luminaire is pointing and thus the position of the light beam on the stage or other space in which it is operational. Typically this position control is done via control of the luminaire's position in two orthogonal rotational axes commonly referred to as pan and tilt. Many products provide control over other parameters such as the intensity, color, focus, beam size, beam shape and beam pattern. The beam pattern is often provided by a stencil or slide called a gobo which may be a steel, aluminum or etched glass pattern. The products manufactured by Robe Show Lighting such as the ColorSpot 700E are typical of the art. Automated luminaire 300 may comprise top box 306, yoke 304 and head 302. in this case the head 302 may contains an embodiment of the LED light homogenizer as the light source of the light engine, not shown but further shown and described below, as well as prior art optical devices such as gobos, shutters, iris, prisms, frost, animation wheel, and other optical devices as well known in the art. In alternative embodiments the majority of the optical engine is stationary and the panning and/or tilting positioning of the light beam is accomplished by a gimbaled mirror redirecting the light beam proximate to output end of the light engine. Such embodiment is not shown but is well known in the art.

Figure 11:
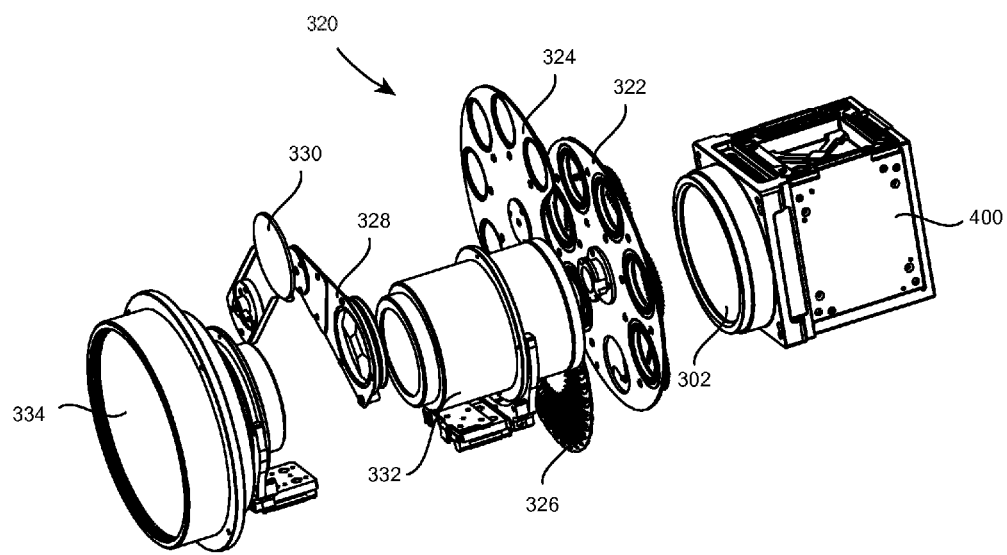
FIG. 11 illustrates the optical engine of an automated luminaire including the improved LED light homogenizer.

FIG. 11 illustrates the optical path of automated luminaire 300 shown in FIG. 10 containing an embodiment of the LED light homogenizer. Light source 400 is an embodiment of the improved light homogenizer. Homogenized light exits light source 400 through source exit optic 302. It the light engine embodiment shown the light beam then pass through rotating, rotating gobo wheel 322, rotating stationary gobo wheel 324, animation wheel 326, lens system 332, selectable rotating prism system 328, and selectable frost system 330, before exiting through final output lens 334. It should be understood that the layout, number, and description of optical devices shown in FIG. 11 is illustrative and that the application of the invention is not so specifically constrained. In practice any number, layout, and type of optical devices may be used in automated luminaire 300 as is well known in the art.

Figure 12:
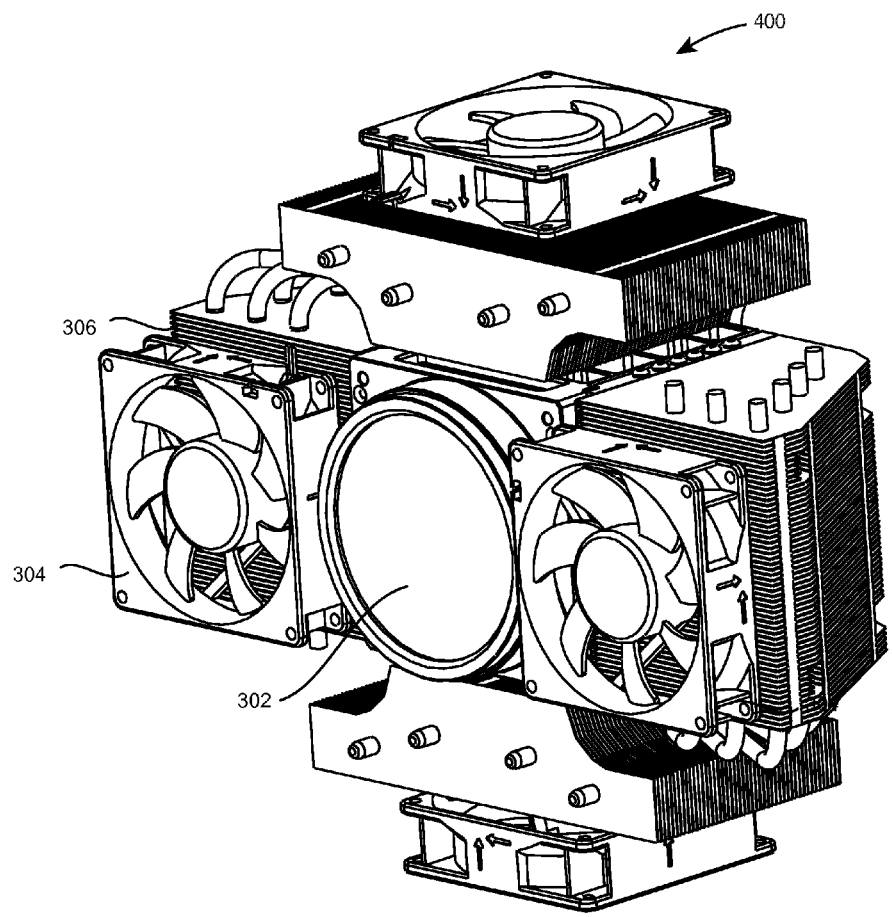
FIG. 12 illustrates a further embodiment of an LED light homogenizer.

FIG. 12 illustrates a further embodiment of an LED light homogenizer which may be as described in FIG. 9 and used in automated luminaire 300 shown in FIG. 10. Light source 400 comprises an embodiment of the improved light homogenizer along with cooling system(s) 304 and 306. Homogenized light exits light source 400 through exit optic 302.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

What is claimed is:
1. A directed light beam luminaire comprising
   a gimbal mechanism for changing the direction of the light beam about at least one axis;
   a light source employing a plurality of LED arrays wherein at least one LED array has at a plurality of LED sets with different discrete wavelength peaks where the output of the plurality of at least one of the sets are controlled independently of the other set(s);
   where the light emitted by the LED arrays are combined via a plurality of dichroic filters mirrors which are maximized to transmit or reflect the discrete wavelength peaks of the LED's employed in the plurality of LED arrays in order to combine light output from the plurality of LED arrays whereby the output light color is achieved by additive color mixing.

* * * * *

UNITED STATES PATENT AND TRADEMARK OFFICE
CERTIFICATE OF CORRECTION

PATENT NO. : 9,885,461 B2
APPLICATION NO. : 14/682853
DATED : February 6, 2018
INVENTOR(S) : Pavel Jurik et al.

Page 1 of 1

It is certified that error appears in the above-identified patent and that said Letters Patent is hereby corrected as shown below:

On the Title Page

Insert Item (63) Related U.S. Application Data --Continuation in Part of application No. 14/155,178, filed on Jan. 14, 2014--

Signed and Sealed this
Twenty-eighth Day of May, 2019

Andrei Iancu
*Director of the United States Patent and Trademark Office*